Sept. 5, 1933.  H. A. B. GOODALL ET AL  1,925,718
TILE TESTING MACHINE
Filed Sept. 9, 1931

INVENTORS.
HERBERT A. B. GOODALL.
FRANK B. CRAMER.
BY
ATTORNEY.

Patented Sept. 5, 1933

1,925,718

UNITED STATES PATENT OFFICE 1,925,718

TILE TESTING MACHINE

Herbert A. B. Goodall and Frank B. Cramer, Long Beach, Calif.

Application September 9, 1931. Serial No. 561,870

4 Claims. (Cl. 73—51)

This invention relates to a tile testing machine, and is particularly applicable to curved roof tile.

An object of our invention is to provide a testing device which may be applied to the usual and well-known tension testing machine, so that a roof tile may be tested to determine the applied load which it can withstand. It has been determined that tile which have a high ultimate breaking point also successfully withstand disintegration from weather conditions.

Another object is to provide a testing device in which a tile can be quickly and easily placed, and the breaking strength thereof quickly determined.

Other objects, advantages and features of invention may appear from the accompanying drawing, the subjoined detailed description and the appended claims.

In the drawing

Figure 1:
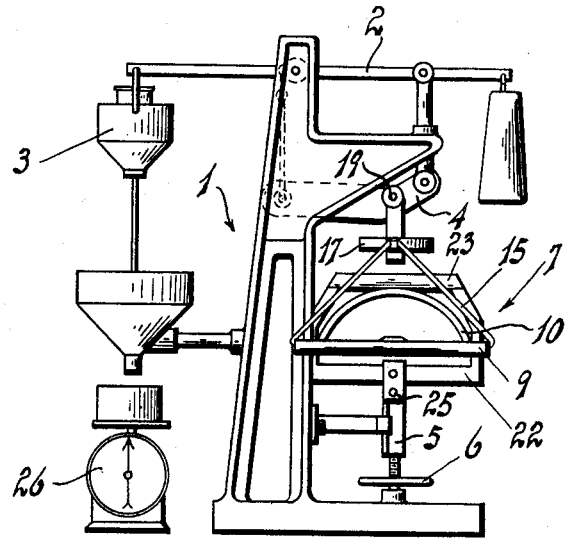
Figure 1 is a side elevation of a tension testing machine with our device attached thereto.

Referring more particularly to the drawing, the numeral 1 indicates a testing machine of the usual and well-known type which includes a balance arm 2, a shot hopper 3 mounted on one end thereof. The balance linkage 4, a vertical slidable plate 5, and a wheel 6 which rotates a threaded shaft so as to move a plate 5, for a purpose which will be further described.

Figure 2:
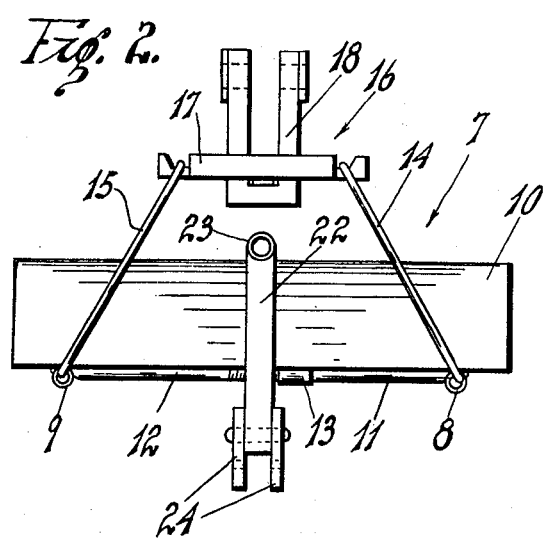
Figure 2 is a side view of our testing device.
Figure 3:
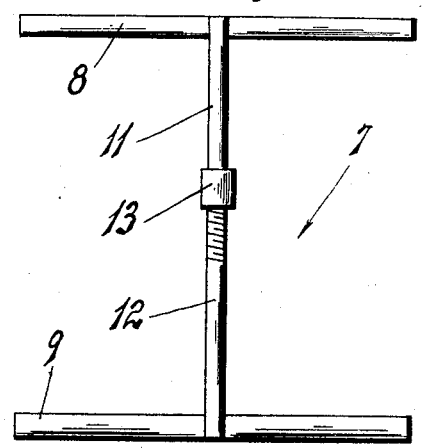
Figure 3 is a top plan view of the supporting cradle with the bales removed.
Figure 4:
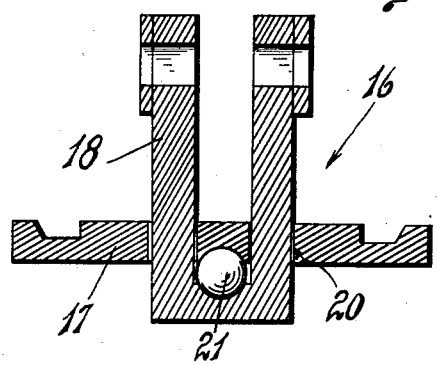
Figure 4 is a transverse, sectional view on an enlarged scale of the supporting hanger.

Our tile testing machine 7 comprises a supporting cradle which includes a pair of spaced pipes 8, 9. The tile 10 rests upon the pipes 8, 9 as shown in Figures 1 and 2. The pipes 8, 9 must be accurately spaced apart, and for roof tile the distance has been set at 12 inches. To maintain the two pipes in proper spaced relation a tube or rod 11, 12 extends from the pipes 8, 9 respectively and these rods are welded to the pipes. A sleeve 13 screws on to the rods thus permitting longitudinal adjustment of the rods to space the pipes and also the pipes 8, 9 can move angularly, relative to each other so as to take care of any irregularity at the bottom edge of the tile, that is, sleeve 13 acts as a swivel joint as well as adjustable spacer. The pipes 8, 9 must be accurately spaced apart, according to the requirements of the Clay Products Institute, and this accurate spacing is accomplished by the sleeve 13.

The cradle 7 is supported by means of two bails 14, 15. These bails are rods or the like which extend through the pipes 8, 9 and are supported at the top upon a supporting hanger 16. The hanger comprises a horizontal plate 17 the ends of which are notched or recessed to receive the bails 14, 15.

A U shaped coupling 18 is attached at its upper end to linkage 4 by means of a suitable bolt or pin 19. The coupling extends through slots 20—20 in the plate 17. A ball 21 is positioned between the coupling 18 and the plate 17 so that the plate may tilt at an angle if the tile 10 is irregular in shape or if the upper surface is tapered.

A pressure yoke 22 is positioned mid-way between the pipes 8, 9 and the upper member 23 of the yoke presses against the top of the tile 10. The yoke 22 is attached to the vertically movable plate 5 by means of a pair of side plates 24 which extend over the plate 5 and a pin 25 which extends through side plates 24 and the plate 5. Thus, it will be seen that when the plate 5 is moved downwardly between wheel 6 and the threaded shaft attached thereto, that the yoke 22 will press downwardly upon the tile and this downward pressure is indicated in the usual manner on the scale 26 until the tile fails. The failure of good tile occurs at 400 or 500 pounds more or less.

Having described our invention, we claim:

1. In combination with a tension testing machine including a vertically movable member and link members, of a tile testing device, comprising a pair of supports upon which the tile rests, a bail rising from each of the supports, a horizontal plate from which said bails are suspended, a U-shaped coupling, said coupling being attached to the linkage, said plate resting on the coupling, a yoke between the supports and means attaching said yoke to the vertically movable member.

2. In combination with a tension testing machine including a vertically movable member and link members, of a tile testing device, comprising a pair of supports upon which the tile rests, means attaching said supports to the linkage, a yoke positioned between the supports, means securing said yoke to the vertically movable member, and spacing means between said supports whereby they are accurately spaced apart, and means to adjust said spacing means.

3. A tile testing device comprising, a pair of spaced supports, a bail rising from each of the supports, a plate from which the bails are suspended, a U-shaped coupling, said plate resting on the coupling, and a pressure yoke positioned between the supports.

4. A tile testing device comprising, a pair of spaced supports, spacing means extending from the supports whereby they are accurately spaced apart, a bail rising from each of the supports, a plate from which the bails are suspended, a U-shaped coupling, said plate resting on the coupling, a ball between the coupling and the plate, a pressure yoke between said supports whereby pressure is applied to the top of the tile to cause failure of the tile.

HERBERT A. B. GOODALL.
FRANK B. CRAMER.